UNITED STATES PATENT OFFICE.

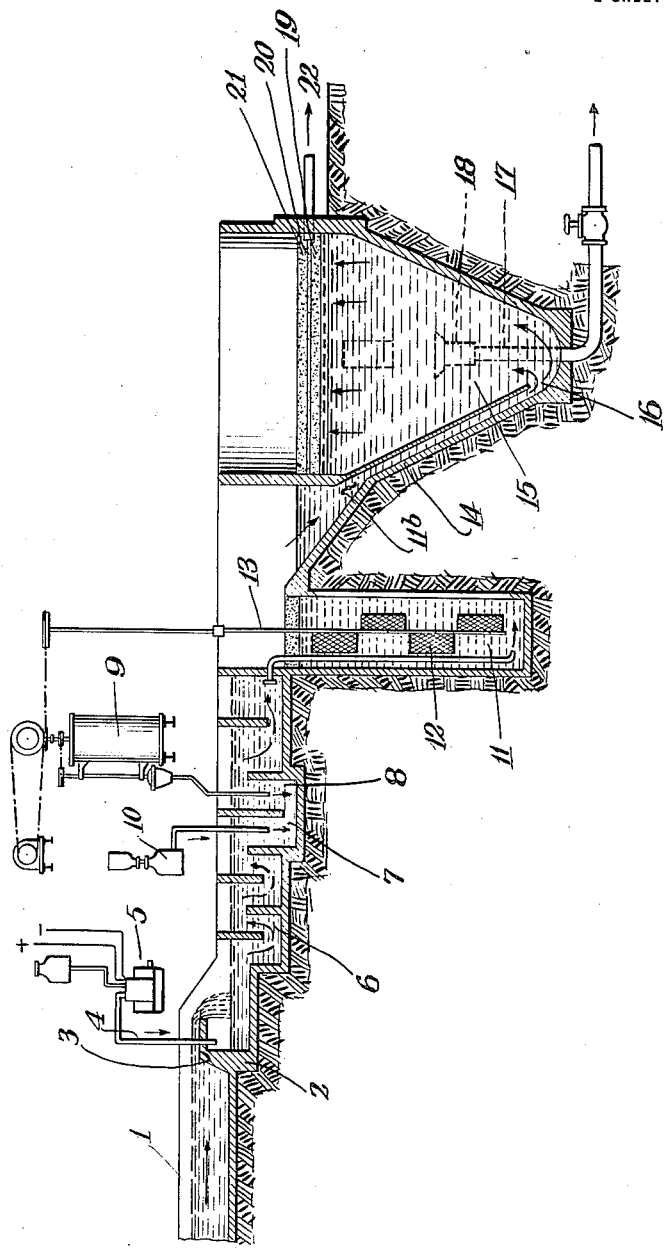

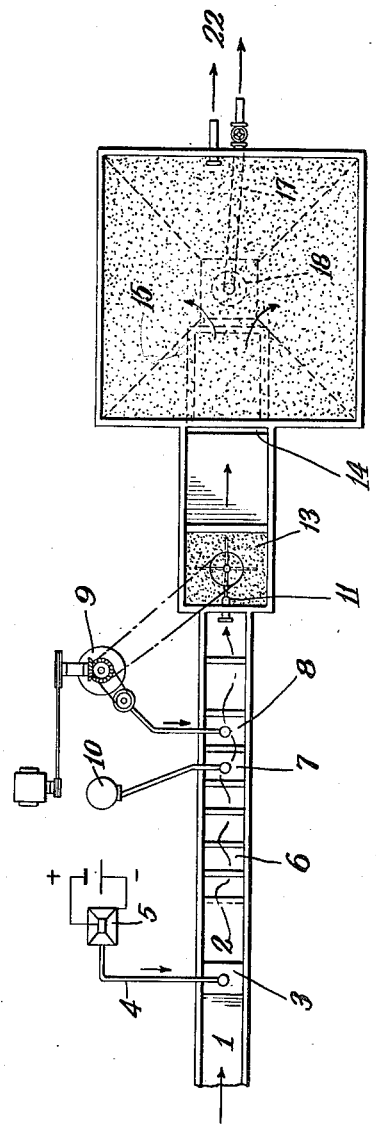

ROBERT HOTTINGER, OF SÃO PAULO, AND OTTO BROMBERG, OF RIO DE JANEIRO, BRAZIL.

PROCESS FOR PURIFYING AND STERILIZING WATER.

1,324,118.  Specification of Letters Patent.  Patented Dec. 9, 1919.

Application filed January 27, 1917. Serial No. 145,033.

*To all whom it may concern:*

Be it known that we, Dr. ROBERT HOTTINGER, a citizen of Switzerland, and resident of São Paulo, Brazil, and Dr. OTTO BROMBERG, a subject of the Emperor of Germany, and resident of Rio de Janeiro, Brazil, have invented a certain new and useful Improved Process for Purifying and Sterilizing Water, of which the following is a specification.

This invention relates to an improved process for purifying and sterilizing the waters of rivers, swamps and the like, in order to make them drinkable, and in strict accordance with hygienic requirements.

According to this invention, the water is subjected to a process which consists in sterilizing the water by treating same with the anode products of an electrolyzed solution of common salt, slightly alkaline ($1.10^{-9} n H^+$), decanting the heavy matters in suspension during such sterilization performed in accordance with the chlorin absorbing capacity of the water, precipitating the chemical impurities and others and eliminating the excess of chlorin and its oxids by means of milk of lime and a colloidal solution of hydrate of iron, improvised on the spot, such as ferric hydroxid in ferric-ferrous chlorid, and finally decanting and filtering the water.

The sterilization of the water is effected by the gaseous platina anode products of a solution of common salt, slightly alkaline ($1.10^{-9} n H^+$). These products, namely, active chlorin which is about 40% more active than pure chlorin, consist of chlorin and various oxids of chlorin. Their dosing is easily and securely effected by regulating the electric current. The water is given so much of the anode products that at least 0.1 mg. per liter remains unfixed, i. e. the quantity is in excess by at least 0.1 mg. of the chlorin index of the water. According to the character of the water larger or smaller quantities of active chlorin are consumed and caused to be absorbed by the water by simply being conducted into the air space behind the water falling down from the salient of a dam over which it has to flow at the entrance of the device (chlorin captor).

The flaking of the water is effected by the new coagulator "ferriol", viz., as stated above, a solution of ferric-ferrous chlorid containing ferric hydroxid in colloidal form, the colloid, on preparing the solution being obtained by adding lime to the water. The flaking or precipitation (sometimes after an addition of milk of lime to the water) takes place after sterilization of the raw water, according to the following equation:

(1) 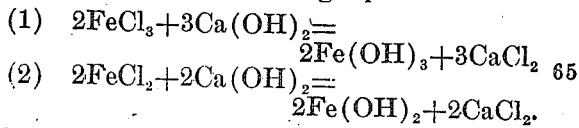

(2) $2FeCl_2 + 2Ca(OH)_2 =$
$2Fe(OH)_2 + 2CaCl_2$.

The active chlorin in excess is fixed as an ion by the ferrous hydroxid (equation 2) formed during the precipitations:

(3) 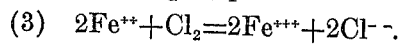

or (less accurately expressed):

(4) 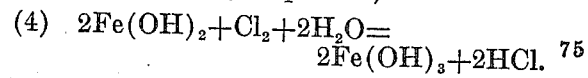

The oxids of chlorin contained in the anode product have an equally oxidizing effect.

Water is more or less deeply colored by an addition of ferriol, according to the quantity added. The faculty of an easy and accurate dosing by the colorimetrical way therefore results from this quality. The formation of flakes is facilitated by stirring or agitating the water. This afterward also greatly facilitates decanting and consequently the subsequent filtration of the water.

The filtration is carried out by the arrangement of a peculiar sand filter, covering the decanting basin, from the bottom of which the water rises to the filter, and flows off from the side of said filter as pure water, without having reached the surface thereof. The use of ferriol, as coagulator, admits of this kind of filtering, (which under other circumstances is not practicable,) owing to the fact that the nascent ferric hydroxid from the ferriol can be removed from the filter by counter-washing. The precipitate does not stick to the grains of sand, probably because it is a precipitate parted from chlorids. Nevertheless, the sand filter must be set up in such a manner as to allow the water to first enter the coarse sand, which is followed upward by layers of successive finer grade. Thus the small filtering channels are of funnel form and taper off in the direction of the filtering process. When the filter is cleansed by a counter-flow of water the flakes easily fall out through the filtering channels as they widen out in the direction of this counter-flow. The flakes falling down from the filter are deposited very quickly and at the next counter-washing are swept away by the cleansing water, and removed from the decanting basin. The quantity of precipitate removed from the filter by the above mentioned cleaning process is equal to that carried into the decanting basin by the water to be pumped. It is important that the layer of flakes in this latter be never entirely removed. The water pouring into the basin to undergo filtration passes through the layer of flakes and produces an agglutinative effect on the flakes, which is found to facilitate the filtration. Furthermore, the last traces of active chlorin are here fixed by the ferrous hydroxid. If, by inadvertence, too much ferriol should have been added to the water, so that owing to want of lime no hydroxid could be formed, the precipitate of hydroxid of iron would be able to absorb a large excess of ferriol (as hydroxychlorid of iron).

In order that this invention may be clearly understood and readily carried into effect, the same will now be described more fully with reference to the accompanying diagrammatic drawings, in which Figure 1 is a longitudinal section of the improved apparatus, and Fig. 2 is a plan view thereof. The raw water flows through channel 1 over a dam 2, so that under the falling water an air space 3 is formed. Into this inclosed air space the active chlorin is conducted through a pipe 4, the gas being furnished by an electrolyzing apparatus 5 provided with a suitable regulating resistance. The water then flows into the basin 6 where the sterilization takes place and, at the same time, sand and slime are decanted. The water is given so much chlorin to absorb when passing over the dam 2 that, when leaving the basin 6, it still contains at least 0.1 mg. per liter in excess. This requirement is easily satisfied by suitably operating the regulating resistance of the electrolyzing apparatus to control the supply of chlorin.

After being sterilized the water passes into two chambers 7 and 8 from the opposite extremity of which it issues in a swell, and in such a manner that the two streams of water from 7 and 8 meet. Into these channels is introduced the necessary quantities of the precipitants ferriol and milk of lime from vessels 9 and 10, the precipitants being intimately mixed with the water owing to the arrangement specified above. It then flows into a pipe or shaft 11, from whence it issues into the bottom of a stirring basin 12, wherein the water is stirred or agitated to accelerate the flaking.

The water then passes through the highly pervious intermediate filter 13 into the decanting well 15. The purpose of the intermediate filter 13 is to prevent the rotary movement of the water in the stirring basin being present when the water enters the decanting well. Finally the water enters the bottom of the decanting well and passes to the surface filter and after passing through the different layers of the filter and reaching the uppermost layer, it flows off sidewise through the upper layer and out of the pipe 22 as pure water. The surface filter consists of a lower layer of coarse sand 19, and superimposed layers of finer grade, whereof the last layer is of extremely fine sand 20. Above the fine filtering layer 20 is placed a layer of coarse sand 21 which the water enters and traverses laterally without reaching the surface thereof, this being due to the fact that the discharge pipe 22 is disposed at a lower level than the surface of the layer. The layer 21 serves as a press layer for the filter and at the same time as a cover for the decanting well. The impure water entering the device leaves it after about 80 minutes as pure drinking water.

The cleaning of the filter is effected by shutting the sluice valve $11^b$ in the pipe or shaft 11 and opening the pipe 17 for some seconds. The water will then flow back from the pipe 22 into the decanting well, sweeping on its way the precipitate almost completely out of the small filtering channels which as previously described widen toward the lower part of the filtering bed. This cleaning operation is preferably carried out once every day.

After about 3 to 5 months so much precipitate will accumulate in the fine layer 20 of the filter that the latter has to be regenerated. This is effected by removing the cover layer 21, so that the water flowing up from the decanting well carries away the precipitate from the fine sand over the surface thereof. This is rapidly effected when the sand is slightly disturbed by raking or similar operation.

We claim—

1. A process for purifying and sterilizing water for drinking purposes, consisting in sterilizing the water by subjecting the same to chlorin produced from an electrolyzed solution of common salt, slightly alkaline ($1.10^{-9}H^{.}$), decanting the heavy matters in suspension during such sterilization, precipitating the chemical impurities and others and eliminating the excess of chlorin and its oxids by means of milk of lime and an improvised and freshly prepared colloidal solution of hydrate of iron in ferric-ferrous chlorid, and finally decanting and filtering the water.

2. A process for purifying and sterilizing water for drinking purposes, consisting in sterilizing the water by causing the same to absorb chlorin in amounts to exceed the chlorin index, maintaining the water in a reservoir so that the chlorin may act on the water and the slimes be decanted, conducting the water through two channels which contain respectively, milk of lime and a colloidal solution of ferric hydroxid in ferric-ferrous chlorid, so as to precipitate the chemical impurities in flakes and eliminate the excess of chlorin, passing the water to a well where it is agitated and brought to vibrations to facilitate the formation of flakes, and finally decanting and filtering the water.

3. A process for purifying and sterilizing water for drinking purposes, consisting in sterilizing the water by causing the same to absorb chlorin in amounts to exceed the chlorin index, maintaining the water in a reservoir so that the chlorin may act on the water and the slime be decanted, conducting the water through two channels which contain respectively, milk of lime and a colloidal solution of ferric hydroxid in ferric-ferrous chlorid, so as to precipitate the chemical impurities in flakes and eliminate the excess of chlorin, passing the water to a funnel-shaped decanting well provided with an automatic decanting device and finally conducting the water through a filter arranged in the upper part of said decanting well.

4. In a process for purifying and sterilizing water as herein set forth, causing the water to absorb chlorin by introducing the gas into the space or arch formed when the water falls over a dam.

5. In a process for purifying and sterilizing water as herein set forth, effecting the precipitation of the chemical impurities and others in flakes and the elimination of excess chlorin in the water, by passing the chlorinized water into two independent channels containing respectively milk of lime and a colloidal solution composed of ferric hydroxid and ferric-ferrous chlorid.

6. In a process for purifying and sterilizing water, for drinking purposes, dissolving chlorin and oxids thereof in the water to sterilize the same and subsequently removing the chlorin and oxids by a solution of ferrous hydroxid.

Signed at the American consulate-general in the city of Rio de Janeiro, Brazil, this 20th day of December A. D. 1916.

Dr. ROBERT HOTTINGER.
Dr. OTTO BROMBERG.